June 20, 1933.  E. E. HEWITT  1,914,601
VALVE SEATING DEVICE
Filed July 23, 1932   2 Sheets-Sheet 1
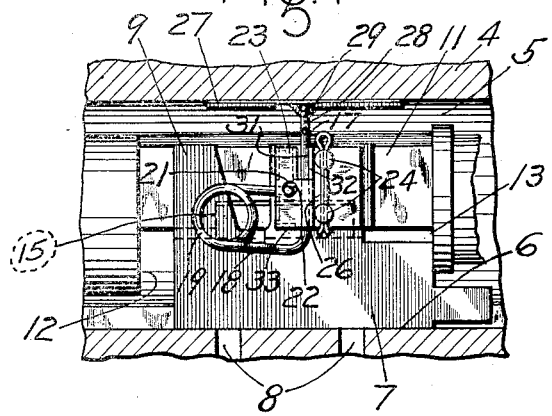
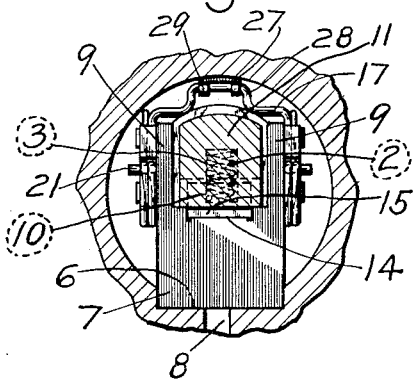
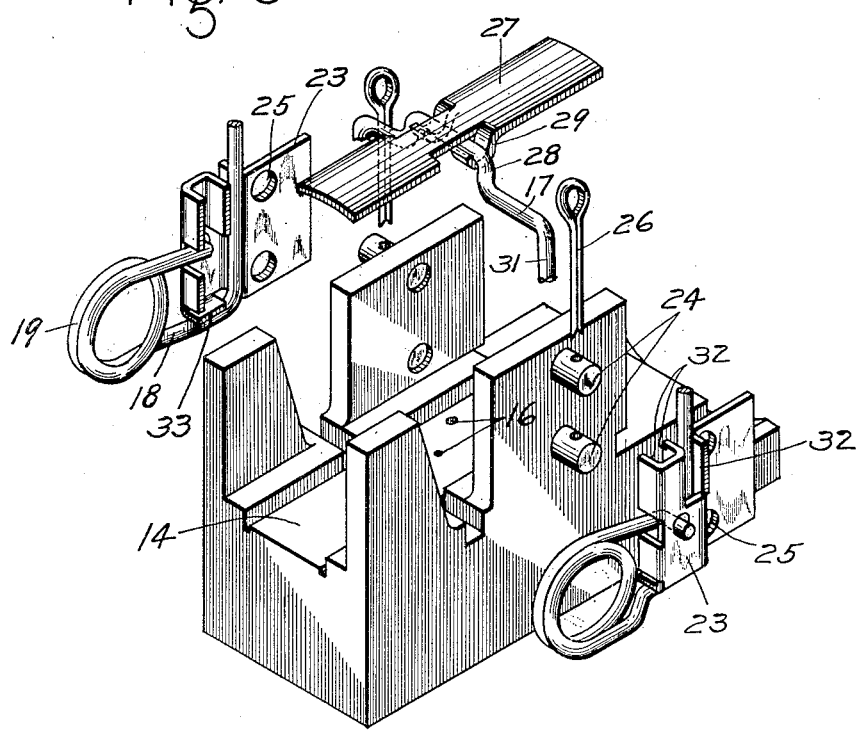
INVENTOR.
ELLIS E. HEWITT.
By *Wm. M. Cady*
ATTORNEY.

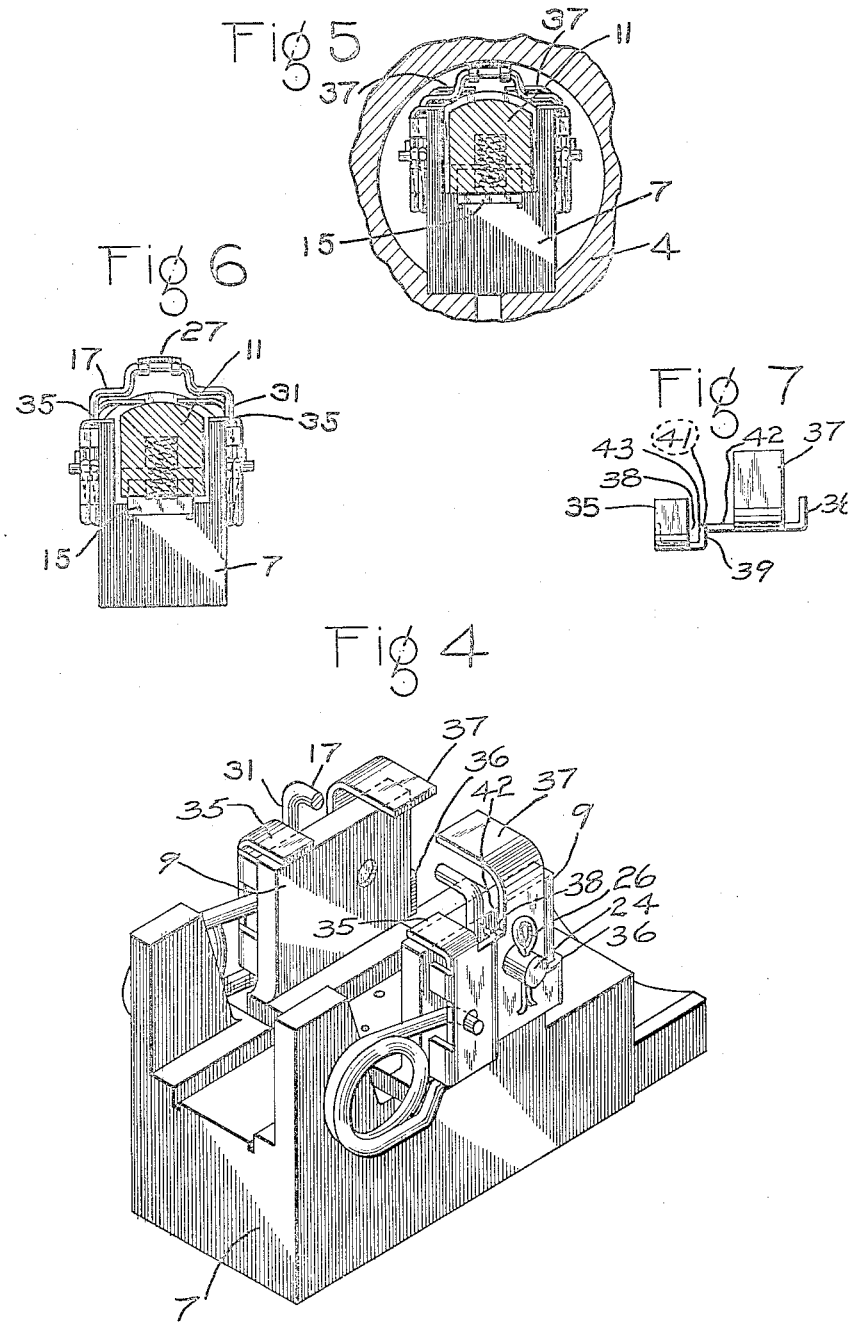

Patented June 20, 1933

1,914,601

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VALVE SEATING DEVICE

Application filed July 23, 1932. Serial No. 624,284.

This invention relates to valve structures and particularly to slide valve structures such as are employed in fluid brake equipment.

A slide valve such as is used in a brake controlling valve device of fluid pressure brake equipment rests upon a valve seat provided in a valve chamber having ports through which fluid may flow to and from the seat. The slide valve is usually maintained in seated position upon the seat by fluid pressure on the upper side of the valve. However, under certain operating conditions, especially when the brake system is being charged, and when there is practically no fluid pressure within the valve chamber, should fluid under pressure be supplied to the under face of the valve through any port leading to the valve seat, the valve may be lifted from its seat. This affords opportunity for foreign particles within the valve chamber to lodge on the seat and causes leakage and abrasion of the valve and seat.

To obviate this undesirable lifting of a slide valve from its seat, it has heretofore been the practice to provide the valve with a butterfly or leaf spring having outwardly directed end or central portions which engage the chamber wall opposite the valve seat and which press the valve upon its seat.

Such springs are usually mounted in the shallow space between the outer face of the valve and the round wall of the chamber and because of the limited space available within the valve chamber for the slide valve and the operating piston stem, the limitations imposed in the design of such springs has rendered it difficult to provide a spring of the leaf type having the proper characteristics of ruggedness and ability to press the valve upon its seat with the positive and uniform force required.

In the well known triple and other brake controlling valve device, a main slide valve is employed and mounted on the main slide valve and having a movement relative thereto is a graduating or auxiliary slide valve.

In order that the main slide valve may be held stationary upon its seat in certain of its operative positions and while the graduating valve is being moved relative thereto by the usual operating stem, loading cavities are provided in the seating face of the main slide valves which are opened at certain times to the atmosphere and which thereby expose at such times, a definite area of the seat face of the main valve to atmospheric pressure, thus increasing the pressure with which the valve is forced upon its seat by the fluid pressure on the upper face of the valve. The valve, therefore, is held upon its seat by the tension of the spring and by fluid pressure which may exert different pressures upon the valve according to whether the loading port is open to the atmosphere or not.

The area of the loading port is unalterable after the valve is placed in service and is usually proportioned to a definite tension value of the spring so as to produce the proper loading when the forces of the fluid pressure on the outer face of the valve and the spring are combined. It is necessary therefore, that the tension of all valve springs be the same or uniform in order that the valve loading be uniform in all valve devices having loading ports of the same definite size.

It has been found quite difficult to obtain leaf springs having the desired uniform tension characteristics under operating conditions, because of the limitations imposed upon the design due to the limited space available for the installation of the spring.

An object of the invention is to provide a seating spring for a slide valve, having the desired uniform tension characteristics and which may be so formed as to provide any desired degree of tension, and for this purpose the seating spring is made of a relatively long section of spring wire having relatively flat loops or coils which may occupy the available space at the side of the valve.

A further object of the invention is to provide a slide valve and seating spring therefor, wherein the valve and spring structures may be readily assembled and wherein the spring is so supported upon the valve that it exerts a substantially uniform tension upon the valve in the direction normal to the direction of movement thereof.

A further object of the invention is to provide a slide valve and seating spring therefor, wherein the spring comprises a single section of spring wire of U-shape and having loops or coils disposed respectively on opposite sides of the valve and anchored to the valve in such manner that the central portion of the spring is guided for movement in a direction normal to the plane of the seat, and wherein the central portion is provided with a friction shoe for engaging a wall of the valve chamber.

A further object of the invention is to provide a slide valve and seating spring therefor wherein the spring or other modified means may serve to retain the slide valve in assembled relation to the stem when the stem and slide valve are removed from the bushing so that the graduating valve is retained in its assembled position upon the slide valve at such times.

These and other objects of the invention that will be made apparent throughout the further description thereof are attained in the valve structure hereinafter described and illustrated in the accompanying drawings wherein;

Fig. 1 is an elevational view, partially in section, of a valve structure embodying features of the invention;

Fig. 2 is an elevational view, partially in section, of the valve structure shown in Fig. 1;

Fig. 3 is an exploded perspective view of the valve and its associated seating spring mechanism;

Fig. 4 is a perspective view similar to Fig. 3 showing a modified form of retaining clip applied to the slide valve;

Fig. 5 is a transverse sectional view, partially in elevation of a valve structure embodying the slide valve and retaining clip shown in Fig. 4;

Fig. 6 is an end elevational view, partially in section of the structure shown in Fig. 4, with the spring expanded and the clip retaining the slide valve and graduating valve in assembled relation to the piston stem; and Fig. 7 is a top plan view of the clip shown in Fig. 4.

Referring to the drawings, the valve structure comprises a casing 4 having a cylindrical bore 5 therein constituting a valve chamber having a flat valve seat 6 upon which a slide valve 7 is adapted to operate. The valve structure herein disclosed is adapted for use in a triple valve device for fluid brake equipment and the seat is provided with the usual ports, examples of which are the ports 8 leading to corresponding passages and which are adapted to be controlled by the slide valve 7 and to be covered and uncovered thereby when the valve is moved longitudinally along the valve seat.

The slide valve 7 is of the usual construction employed in triple valve devices with the exception of certain modifications incident to the mounting thereon of the improved seating spring to be hereinafter described. The valve 7 is provided with the usual outwardly extending wings 9, between which the piston stem 11 extends. Stem 11 is provided with the usual shoulders 12 and 13 so spaced as to provide a lost motion connection between the stem and the valve in order that the stem may be moved a limited distance without imparting movement to the valve.

Between the wings 9, the valve is provided with a valve seat 14 adapted to receive a graduating valve 15 that is connected to the stem 11 and which is moved with the stem, it being understood that the seat 14 may be provided with ports such as the ports 16 for conducting fluid under pressure and which are controlled by the graduating valve 15. The graduating valve is yieldingly pressed upon the valve seat 14 by a coil spring 2 that is mounted in recesses 3 and 10 in the stem 11 and graduating valve 15 respectively. From the foregoing, it is apparent that the stem and graduating valve may be moved to cover and uncover ports 16 without imparting movement to the slide valve 7.

Movement of the slide valve 7 is frictionally opposed by reason of the combined forces of a spring and fluid pressure on the outer face of the slide valve tending to hold the valve upon its seat.

The pressure with which the fluid pressure in the valve chamber acts to hold the slide valve seated may be varied by providing loading cavities on the seating face of the slide valve, which cavities may be opened in certain positions of the slide valve, to the atmosphere so that the pressure with which the valve is held to its seat is increased.

In order to firmly retain the valve 7 upon its seat when there is no fluid pressure within the chamber 5 and while the fluid pressure brake system is being charged, so that the fluid under pressure supplied to any port leading to the valve seat cannot raise the valve from its seat, a seating spring 17 is provided which is adapted to press against a wall of the valve chamber and the valve, and to yieldingly force the valve upon its seat.

The seating spring 17 comprises a single relatively long piece of spring wire, that is of U-shape as indicated in Fig. 2, the end portions of the spring being formed in the form of loops 18 which include coils 19 having one full turn. The loop portions of the spring straddle the slide valve 7 as indicated in Figs. 1 and 2 and the ends 21 of the spring which are bent outwardly, are supported in holes 22 provided in retaining clips 23 that are made of pressed metal and which are detachably secured to the side faces of the valve 7 by means of pins 24 which extend through holes 25 in the clip. Cotter pins 26 serve to retain the clips in operative position upon the pins 24.

It will be noted that the central portion of the spring 17 is provided with a friction shoe 27 that is pivotally connected to an offset portion 28 of the spring by means of integral fingers 29 and that the offset portion serves to center said shoe. The leg portions 31 of the spring which extend along the outer side faces of the valve are enclosed within guides 32 formed in the clips 23, so as to prevent angular movement of the central portion of the spring while permitting movement toward the valve seat. The normal shape of the spring is such that when the valve 7 is removed from the chamber 5, the offset portion 28 of the spring is biased outwardly until the loop portions 18 of the spring engage the flanged ends 33 of the clips 23. When the valve and spring is inserted within the chamber 5, the spring is placed under tension and occupies the position shown in Figs. 1 and 2, wherein the valve 7 is held against its seat 6 by the force of the depressed spring and the fluid pressure on the outer face of the valve. When the slide valve spring and stem are removed from the bushing 4, the central portion of the spring engages the outer face of the stem and retains the stem, slide valve and graduating valve in assembled relation.

Because of the relatively long loop and coil structure of the spring, springs made in the same die and of the same spring material have been found to have uniform tension characteristics and since the degree of depression is limited so that the stress imposed upon the spring does not exceed the elastic limit thereof, there is no tendency of the spring to appreciably vary its tension characteristics while in service.

As indicated in Fig. 2, the loop and coil portions of the spring are disposed exteriorly on the wings 9 of the valve and occupy the space within the chamber and at the side of the valve. The spring construction is compact, inexpensive and offers no interference with other parts of the valve structure. The construction is inexpensive since all of the parts may be machine made and it is obvious that the assembly is comparatively simple.

In Figs. 4, 5, 6 and 7, a modified form of retaining clip is disclosed wherein but a single pin 24 is required to retain the clip in assembled relation to the slide valve 7. This is rendered possible by the provision of integral bent lugs 35 and 36 which respectively engage the outer and end edges respectively of the wings 9 and prevent rotation of the clip upon the pin 24.

The clips are each provided with an integral stop finger 37 which extends over the stem 11 in spaced relation thereto when the stem is in operative assembled relation to the slide valve 7 and the bushing 4 as shown in Fig. 5. The purpose of the stop fingers is to engage the stem and retain the parts in assembled relation when the stem and slide valve are withdrawn from the bushing. At such time, the parts of the structure including the graduating valve 15 will be retained in the relative positions shown in Fig. 6.

It will be noted that the leg 31 of the spring is guided in a channel or guide-way 38, Fig. 7 and engages the edge of the lug 35 and the wall 39 of the channel or guideway. Since the clip is retained by a cotter pin 26 there may be a slight space between the inner face of the clip and the outer face of the wing 9, into which the leg 31 may become wedged due to the guiding action of the rounded corner 41 formed by bending the wall 39 normal to the plane of the clip, which would ordinarily be engaged by the round leg of the spring. To obviate this condition the clip is notched at 42 so that when the wall 39 is bent, a portion thereof having a flat edge 43 constitutes the upper portion of the wall, which portion presents a square corner 43 to the outer face of the wing 9 and to the round leg and prevents the leg 31 of the spring from becoming wedged between the clip and the wing 9.

The spring 17 used with the modified clip is substantially the same as that shown in Fig. 3 and operates in the manner of that spring, with the exception that the spring does not function to retain the slide valve and stem in assembled relation when such parts are removed from the bushing. As previously mentioned, the fingers 37 serve to perform such function.

While but two embodiments of the invention are disclosed, it is obvious that changes may be made in the shape of the spring and the method of attaching it to the slide valve without departing from the spirit of the invention.

Having now described my invention, what I claim as new and desire to secure by Letters Patent, is:

1. A valve structure comprising a casing having a valve chamber and a valve seat therein, a slide valve for engaging said seat and means for yieldingly pressing the valve into engagement with said seat comprising a wire spring having one end anchored to said valve, a loop portion substantially in a plane parallel to the plane of the side of said valve and a free portion held depressed by the wall of said casing opposite said seat.

2. A valve structure comprising a casing having a valve chamber and a valve seat therein, a slide valve for engaging said seat and means for yieldingly pressing the valve into engagement with said seat comprising a wire spring having a portion anchored to said valve, a loop portion disposed along the side of said valve and a free portion held depressed by the wall of said casing opposite said seat.

3. A valve structure comprising a casing having a valve chamber and a valve seat therein, a slide valve for engaging said seat and means for yieldingly pressing the valve into engagement with said seat comprising a wire spring having a pair of end portions anchored to said valve and on opposite sides thereof respectively, a pair of loop portions disposed respectively upon opposite sides of said valve and a free portion joining said loop portions and held depressed by the wall of said casing opposite said seat.

4. A valve structure comprising a casing having a valve chamber and a valve seat therein, a slide valve for engaging said seat and means for yieldingly pressing the valve into engagement with said seat comprising a wire spring having a pair of end portions anchored to said valve and on opposite sides thereof respectively, a pair of loop portions disposed respectively upon opposite sides of said valve, a free portion joining said loop portions and held depressed by the wall of said casing opposite said seat, and means carried by said valve for releasably retaining said wire spring in operative position upon said valve.

5. A valve structure comprising a casing having a valve chamber and a valve seat therein, a slide valve for engaging said seat and means for yieldingly pressing said valve into engagement with said seat comprising a wire spring of U-shape having end portions provided with loops extending along opposite sides of said valve and anchored on said valve, the free intermediate portion of said spring being adapted to be depressed toward the said seat by the wall of said chamber opposite said seat.

6. A valve structure comprising a casing having a valve chamber and a valve seat therein, a slide valve for engaging said seat and means for yieldingly pressing said valve into engagement with said seat comprising a wire spring of U-shape having end portions provided with loops anchored on opposite sides of said valve, the free intermediate portion of said spring being adapted to be depressed toward said seat by the wall of said chamber opposite said seat.

7. A valve structure comprising a casing having a valve chamber and a valve seat therein, a slide valve for engaging said seat, means for yieldingly pressing said valve into engagement with said seat comprising a wire spring of U-shape having end portions provided with loops straddling said valve, and a free intermediate portion adapted to be depressed toward said seat by the wall of said chamber opposite said seat, and means for connecting said loop portions of said spring to said valve and for limiting the movement of the free portion of said spring.

8. A valve structure comprising a casing having a valve chamber and a valve seat therein, a slide valve for engaging said seat, means for yieldingly pressing said valve into engagement with said seat comprising a wire spring of U-shape having end portions provided with loops straddling said valve, and a free intermediate portion adapted to be depressed toward said seat by the wall of said chamber opposite said seat, and means for connecting said loop portions of said spring to said valve comprising a pair of clips each comprising a bent metal member attached to the valve and provided with a bearing opening for receiving the end of said spring and preventing lateral displacement of said loop portions, and a guide opening for receiving a portion of said loop portion for limiting longitudinal movement of said intermediate portion.

9. A valve structure comprising a casing having a valve chamber and a valve seat therein, a slide valve for engaging said seat, means for yieldingly pressing said valve into engagement with said seat comprising a wire spring of U-shape having end portions provided respectively with loops anchored to said valve and a free intermediate portion, and a sliding shoe mounted on said intermediate portion for engaging the wall of said chamber opposite said valve seat.

10. The combination with a casing having a seat, a slide valve for engaging said seat, a piston stem for operating said valve and a graduating valve disposed between said stem and said slide valve, of a spring device engaging said casing and said slide valve for holding said slide valve in engagement with said seat, and a clip for securing said spring device in operative position, and secured to said slide valve and engaging said stem for retaining said valves and said stem in assembled position when said valves and said stem are removed from said casing.

In testimony whereof I have hereunto set my hand, this 20th day of July, 1932.

ELLIS E. HEWITT.